United States Patent
Kato et al.

(10) Patent No.: US 7,502,131 B2
(45) Date of Patent: Mar. 10, 2009

(54) DATA PROCESSING DEVICE, FACSIMILE MACHINE HAVING DATA PROCESSING FUNCTION, DATA MANAGING DEVICE ASSOCIATED WITH THE DATA PROCESSING DEVICE AND COMPUTER PROGRAM

(75) Inventors: Tokunori Kato, Ichinomiya (JP); Megumi Kamata, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1052 days.

(21) Appl. No.: 10/807,233

(22) Filed: Mar. 24, 2004

(65) Prior Publication Data

US 2004/0190073 A1 Sep. 30, 2004

(30) Foreign Application Priority Data

Mar. 28, 2003 (JP) .............................. 2003-092428

(51) Int. Cl.
*G06K 1/00* (2006.01)

(52) U.S. Cl. ..................... 358/1.15; 358/442; 358/1.16; 379/100.09; 709/206; 709/213

(58) Field of Classification Search ................. 358/474, 358/1.15, 442, 402, 403, 1.14; 379/100.93, 379/100.09, 100.01; 709/206, 213
See application file for complete search history.

(56) References Cited

U.S. PATENT DOCUMENTS

| | | | |
|---|---|---|---|
| 5,237,428 A | 8/1993 | Tajitsu | |
| 5,508,821 A | 4/1996 | Murata | |
| 5,608,874 A | 3/1997 | Ogawa | |
| 6,583,889 B1 * | 6/2003 | Koyanagi et al. | 358/1.16 |
| 7,068,386 B2 * | 6/2006 | Kawanabe | 358/1.15 |
| 7,139,093 B2 * | 11/2006 | Iida | 358/1.15 |
| 7,307,744 B2 * | 12/2007 | Hikawa | 358/1.14 |
| 7,345,774 B2 * | 3/2008 | Schinner | 358/1.12 |
| 7,375,844 B2 * | 5/2008 | Kitahara et al. | 358/1.6 |

(Continued)

FOREIGN PATENT DOCUMENTS

DE 198 20 479 A1 12/1999

(Continued)

OTHER PUBLICATIONS

Baker et al., "Electronic Diskette Unit," *IBM Technical Disclosure Bulletin*, vol. 26, No. 4, pp. 1855-1857, XP002028955 {Sep. 1, 1983}.

*Primary Examiner*—Edward L Coles
*Assistant Examiner*—Negussie Worku
(74) *Attorney, Agent, or Firm*—Oliff & Berridge, PLC

(57) ABSTRACT

A digital multifunction device is provided with a RAM having a virtual drive area. A persona computer is connected to the digital multifunction device and is capable of communicating therewith via USB interface. The digital multifunction device enables a personal computer to recognize this virtual drive area as an external storage device, and the personal computer can access to the virtual drive area. Upon receipt of facsimile data, the digital multifunction device converts one page worth data to image data of PDF or TIFF format each time the one page worth data is received. After full page worth data have been received and the converted PDT or TIFF image data are put together in a single data file, the data file is written to the virtual drive area.

32 Claims, 12 Drawing Sheets

U.S. PATENT DOCUMENTS

| | | | |
|---|---|---|---|
| 7,403,311 B2 * | 7/2008 | Kagawa | 358/474 |
| 2001/0050875 A1 | 12/2001 | Kahn | |
| 2003/0184801 A1 * | 10/2003 | Murata | 358/1.16 |
| 2004/0172622 A1 * | 9/2004 | Francis | 717/121 |
| 2004/0179224 A1 * | 9/2004 | Kidokoro | 358/1.14 |
| 2004/0190040 A1 * | 9/2004 | Fukao | 358/1.15 |
| 2004/0190073 A1 * | 9/2004 | Kato et al. | 358/400 |

FOREIGN PATENT DOCUMENTS

| | | |
|---|---|---|
| EP | 1 030 512 A2 | 8/2000 |
| EP | 1 199 874 A2 | 4/2002 |
| JP | A 4-008055 | 1/1992 |
| JP | A 11-331469 | 11/1999 |
| JP | A 2001-282694 | 10/2001 |
| JP | A 2003-046700 | 2/2003 |

* cited by examiner

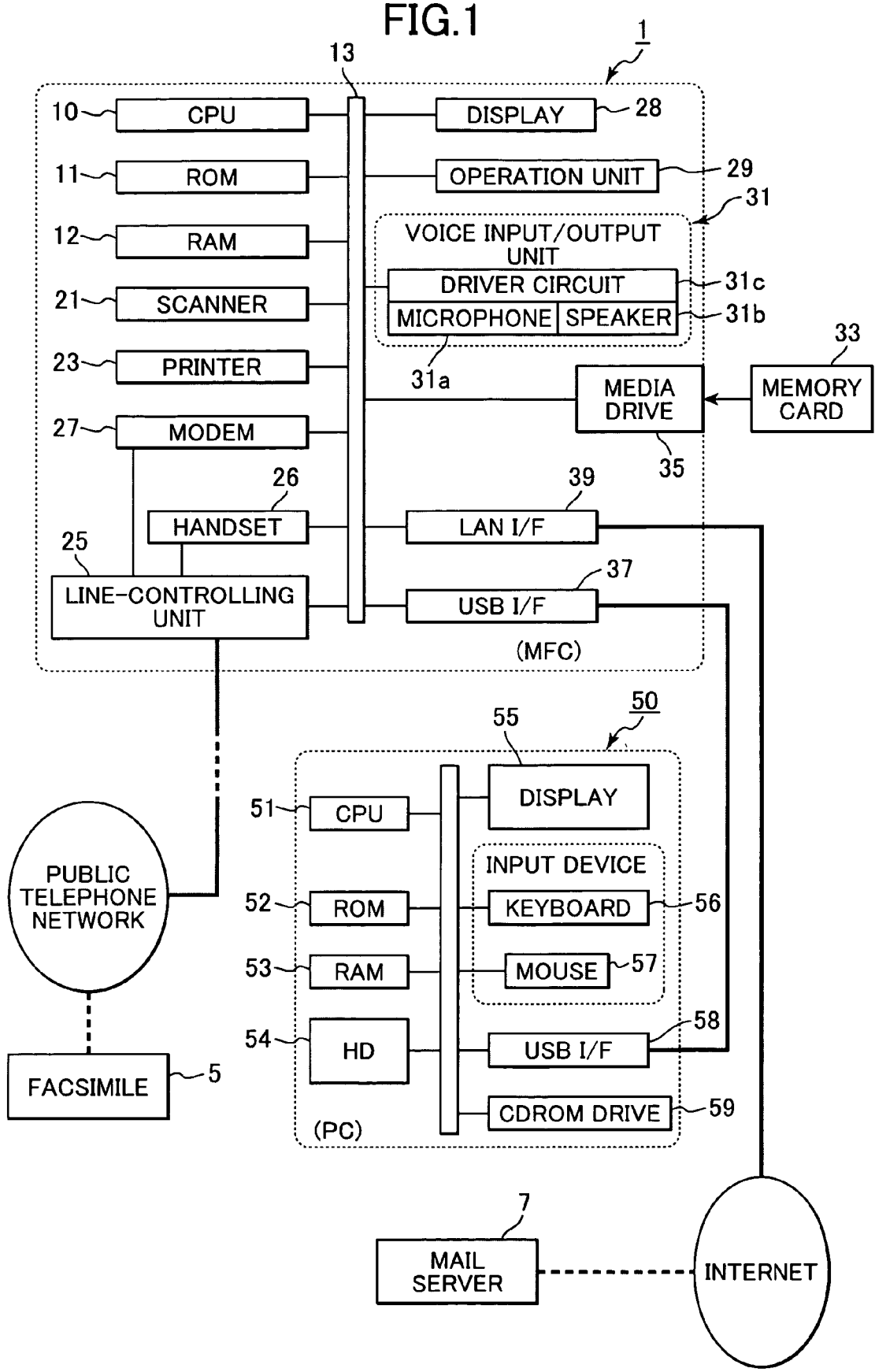

FIG.8

| DATE | TIME | TYPE | FROM/TO | DURATION | PAGE | RESULT | FILE NAME |
|---|---|---|---|---|---|---|---|
| 2003/2/10 | 15:10 | Rx (RECEPTION) | AAAAAA | 100 | 3 | OK | 200302101510 |
| 2003/2/11 | 10:20 | Tx (TRANSMISSION) | BBBBB | 20 | 2 | OK | 200302111020 |

DATA PROCESSING DEVICE, FACSIMILE MACHINE HAVING DATA PROCESSING FUNCTION, DATA MANAGING DEVICE ASSOCIATED WITH THE DATA PROCESSING DEVICE AND COMPUTER PROGRAM

BACKGROUND OF THE INVENTION

The present invention relates to a data processing device for handling image data, a facsimile machine having data processing function, a data managing device for managing image data to be handled by the data processing device, and a computer program employed by the data processing device, the data managing device and the facsimile machine.

Conventionally, have been known a facsimile machine and a personal computer installing therein an application software for performing facsimile data transmission and reception, as a data processing device. Image data is obtained through a communication unit such as a modem from an external network such as a public telephone line network and an internet, and the obtained image data is processed with the data processing device.

Further, known is an image data reception processing method, in which received image data is successively stored in a work region prepared in a memory (RAM), and the image data which have been stored in the memory are subjected to a predetermined processing (such as printing processing) when the image data reception is regularly or normally completed.

In case of a facsimile machine with a reduced memory capacity, if facsimile data whose volume exceeds the reduced memory capacity is transmitted from an external facsimile machine to the facsimile machine with the reduced memory capacity, data reception cannot be normally completed. In order to avoid this drawback, according to an invention described in Japanese Patent Application Publication No.Hei-4-8055, a received data stored in the memory is temporarily transferred to a hard disc or other memory unit of an external host device connected to the facsimile machine with an interface, if a remaining memory capacity becomes not more than a predetermined amount.

The above-described technique has been proposed in an attempt to normalize the reception of the facsimile data in case of the facsimile machine having the reduced memory capacity. If such data transferring technique is employed, the facsimile data can be inspected at the external host device as described in Japanese Patent Application Publication No.2001-282694.

However, in the conventional device, in order to allow the external host device to be able to inspect the facsimile data, an appropriate application software for enabling inspection of the facsimile data must be installed in the external host device, and the facsimile machine must also install an application software compatible with the appropriate application software.

Such application software requires complicated bi-directional protocol so that the structure of the software is complicated, and require greater time and labor for development. Moreover, a prolonged time period is required for communication between the external host device and the facsimile machine.

SUMMARY OF THE INVENTION

It is a primary object of the present invention to provide a data processing device, a facsimile machine, and a program capable of transmitting to a terminal device only a selected image data among image data received through a network by a communication device, the selected image data being needed by a user of the terminal device, even if the terminal device does not install an appropriate application software.

Another object of the present invention is to manufacture the data processing device and the facsimile machine at low cost by making use of resources in the data processing device while attaining the primary object described above.

Still another object of the present invention is to provide a data managing device and a program used therein, capable of managing image data to be handled in the data processing device.

These and other objects of the present invention will be attained by a data processing device that is connected to and in communication with a terminal device including a memory unit, a recognition setting unit, a communication unit, a data acquiring unit, a converting unit, and a writing unit. The memory unit includes an image data storage area that stores therein image data. The recognition setting unit enables the terminal device to recognize the image data storage area in the memory unit as an external storage device so as to enable the terminal device to be accessible to the image data storage area. The communication unit is connected to the terminal device through an external network. The data acquiring unit acquires image data received by way of the communication unit from the external network. The converting unit converts the acquired image data acquired by the data acquiring unit through the communication unit into converted image data whose format is compatible with the terminal device. The writing unit writes the converted image data converted by the converting unit into the image data storage area.

In another aspect of the invention, there is provided a facsimile machine including a scanner unit that reads an image of an original document, the communication unit, the memory unit, the recognition setting unit, the data acquiring unit, the converting unit, and the writing unit.

In still another aspect of the invention, there is provided a data managing device for use in combination with the data processing device. The data managing device includes a nonvolatile storage medium that stores image data, a determination unit, a duplicating unit, and a deletion unit. The determination unit makes judgment as to whether or not the image data has been stored in the external storage device in the data processing device. The duplicating unit writes the image data stored in the external storage device into the nonvolatile storage medium if the determination unit judges that the image data has been stored in the external storage device. The deletion unit deletes the image data having been stored in the external storage device from the external storage device after writing the image data into the nonvolatile storage medium by the duplicating unit.

In still another aspect of the invention, there is provided a storage medium that stores a program for permitting a facsimile machine to function as a data processing device, the facsimile machine including a communication unit connected to a terminal device through an external network, and a memory unit comprising an image data storage area that stores therein image data. The program at least contains first through fourth programs. The first program enables the terminal device to recognize the image data storage area in the memory unit as an external storage device so as to enable the terminal device to be accessible to the image data storage area. The second program acquires image data received by way of the communication unit from the external network. The third program converts the acquired image data through the communication unit into converted image data whose format is compatible with the terminal device. The fourth program writes the converted image data converted by the converting unit into the image data storage area.

In still another aspect of the invention, there is provided a storage medium that stores a program for permitting a personal computer to function as a data managing device for use in combination with the data processing device, the personal computer including a nonvolatile storage medium that stores image data. The program contains first through third programs. The first program makes a judgment as to whether or not the image data has been stored in the external storage device in the data processing device. The second program duplicates the image data stored in the external storage device into the nonvolatile storage medium if the image data has been stored in the external storage device. The third program deletes the image data having been stored in the external storage device from the external storage device after duplicating the image data into the nonvolatile storage medium.

BRIEF DESCRIPTION OF THE DRAWINGS

In the drawings:

FIG. 1 is a block diagram showing structures of a digital multifunction device and a personal computer to which the present invention is applied;

FIG. 2(a) is an explanatory diagram showing a structure of a RAM 12; when virtual drive function is on;

FIG. 8 is an explanatory diagram showing a structure of a log file;

DETAILED DESCRIPTION OF THE PREFERRED EMBODIMENT

Figure 2A:
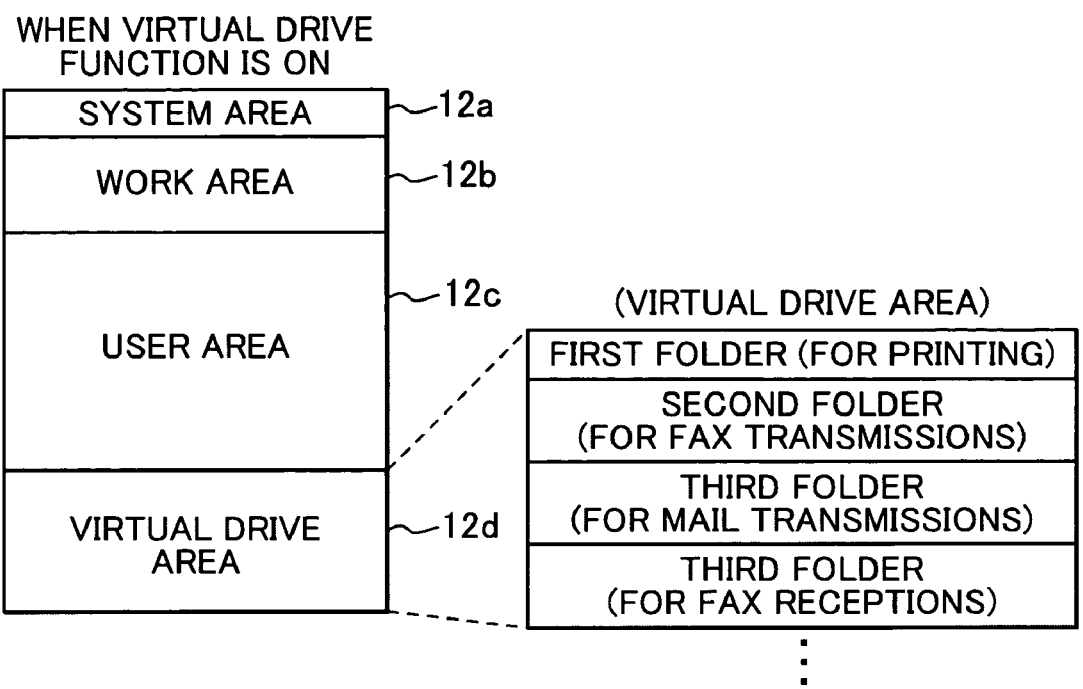

Next, a preferred embodiment of the present invention will be described with reference to the drawings. FIG. 1 shows the constructions of a digital multifunction device (MFC) 1 serving as the facsimile machine to which the present invention is applied and a personal computer (PC) 50 serving as the terminal device.

The digital multifunction device 1 includes a CPU 10 for performing comprehensive control of the device, and memory (a ROM 11 and a RAM 12) for storing programs, data, and the like required for operations by the CPU 10. The CPU 10 controls various components of the device, such as a scanning unit 21, a printing unit 23, and a line-controlling unit 25, via a bus 13 in order to implement a facsimile function, a printer function, a copier function, and the like.

The scanning unit 21 scans image content from an original document for fax transmissions (that is, the transmission of facsimile data), copying, and the like. The scanning unit 21 acquires an original document on which an image of text, graphics, or the like is formed from a paper supply tray (not shown) of the digital multifunction device 1. The scanning unit 21 then optically scans the image from the original and generates image data as the scanning results.

The printing unit 23 functions as an image forming unit for forming (printing) color images or monochrome images on a recording paper. The printing unit 23 forms images based on image data on the recording paper when image data for printing is inputted from an external source.

The line-controlling unit 25 performs such processes as transmitting dial signals to a public telephone network and responding to call signals from the public telephone network. The line-controlling unit 25 is connected to the public telephone network, serving as the external network, via telephone lines installed in the building and transmits and receives facsimile data, voice communications, and the like between an external communication terminal (a facsimile machine 5, a telephone terminal, and the like) via this public telephone network.

Further, a modem 27 connected to the line-controlling unit 25 functions to convert facsimile data to communication signals to be transmitted via the public telephone network and extracts facsimile data by demodulating signals received from the public telephone network. In addition, a handset 26 is connected to the line-controlling unit 25 to enable voice communications in the digital multifunction device 1 with an external telephone terminal.

The digital multifunction device 1 also includes a liquid crystal display 28, an operation unit 29 including a plurality of operating keys, and the like. When various commands are inputted through user operations on the operation unit 29, the CPU 10 executes processes corresponding to the type of command.

For example, if a fax transmission command is inputted from the operation unit 29, the digital multifunction device 1 generates facsimile data by optically scanning an image from the original document using the scanning unit 21. Subsequently, the digital multifunction device 1 transmits the generated facsimile data to the external facsimile machine 5 connected to the public telephone network via the modem 27 and the line-controlling unit 25. Further, when facsimile data is received from the facsimile machine 5, the digital multifunction device 1 acquires the facsimile data via the line-controlling unit 25 and the modem 27 and controls the printing unit 23 to form an image based on the facsimile data (facsimile function).

When a copy command is inputted from the operation unit 29, the digital multifunction device 1 scans the image from the original using the scanning unit 21, inputs this image data into the printing unit 23, and controls the printing unit 23 to form an image on recording paper based on this image data (copier function).

The digital multifunction device 1 also includes a voice input/output unit 31 for implementing a hands-free function. The voice input/output unit 31 includes a microphone 31a, a speaker 31b, and a drive circuit 31c for driving the microphone 31a and speaker 31b. The digital multifunction device 1 also includes a media drive 35 for reading various data from and writing various data to a memory card 33, such as a Compact Flash (registered trademark) card or the like.

The digital multifunction device 1 also includes a USB (universal serial bus) interface 37 and a LAN (local area network) interface 39. When image data is received from the external personal computer 50 via the USB interface 37 or from a personal computer connected to a LAN or the Internet via the LAN interface 39, the digital multifunction device 1 directs the printing unit 23 to form images based on this image data on recording paper (printer function).

The digital multifunction device 1 has a virtual drive function that enables the personal computer 50 connected to the USB interface 37 to recognize an area of the RAM 12 (a virtual drive area 12d described later) as an external storage device and allows the personal computer 50 to access this area.

Figure 2B:
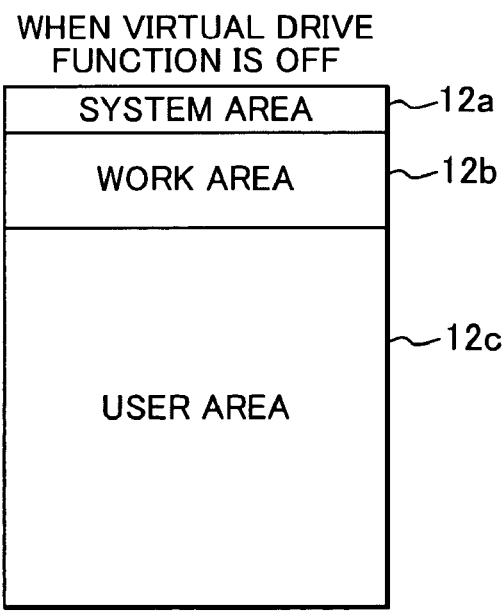
FIG. 2(b) is an explanatory diagram showing a structure of RAM 12 when virtual drive function is off.

The RAM 12 is configured primarily of a system area 12a, a work area 12b, a user area 12c, and a virtual drive area 12d. FIG. 2(a) is an explanatory diagram showing the structure in the RAM 12 when the virtual drive function is rendered ON. FIG. 2(b) is an explanatory diagram showing the structure in the RAM 12 when the virtual drive function is rendered OFF.

The system area 12a is a memory space provided for executing programs for the primary management and operations of the digital multifunction device 1. The work area 12b is a memory space used for executing various functions possessed by the digital multifunction device 1. The user area 12c is a memory space for temporarily storing image data such as facsimile data acquired from an external source via the line-controlling unit 25, the USB interface 37, the LAN interface 39, and the like. The virtual drive area 12d is a memory space that the personal computer 50 can recognize as an external storage device.

The virtual drive area 12d is created only when the virtual drive function is on. The memory space corresponding to the virtual drive area 12d is used as the user area 12c while the virtual drive function is off. The virtual drive area 12d has a tree-like folder structure (called a directory), in which folders data files are sorted and stored.

Figure 3:
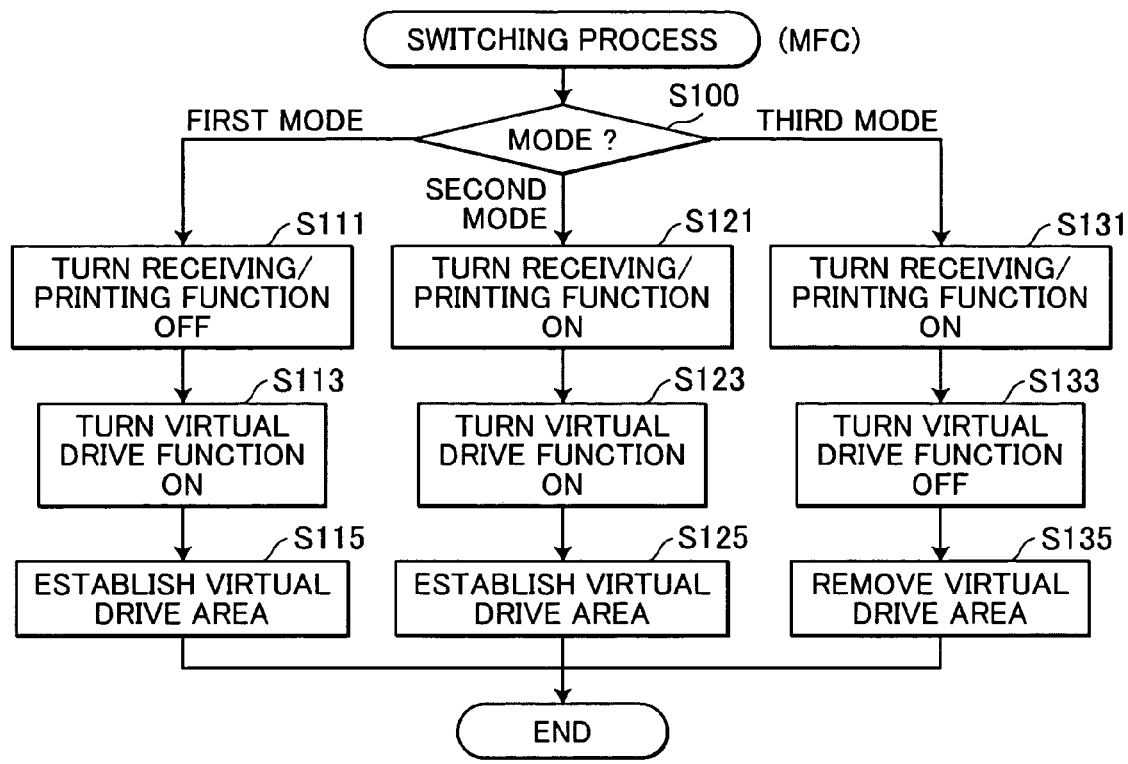
FIG. 3 is a flowchart showing steps in a switching process executed by a CPU in the digital multifunction device.
Figure 4:
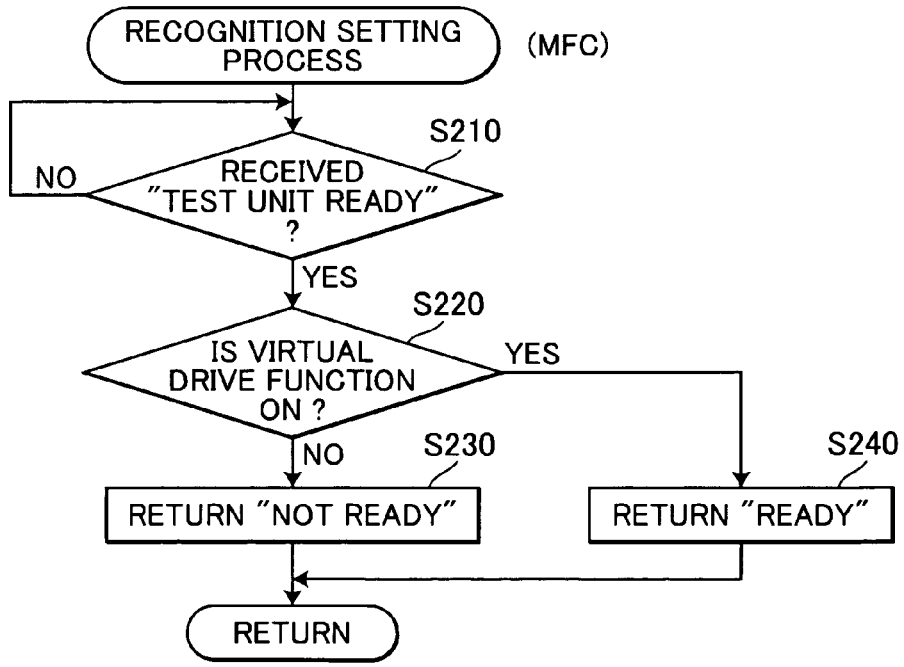
FIG. 4 is a flowchart showing steps in a recognition setting process executed by the CPU.

Switching the virtual drive function (ON/OFF) is implemented in a switching process shown in FIG. 3 and a recognition setting process shown in FIG. 4. FIG. 3 is a flowchart showing the switching process executed by the CPU 10 when a switch command is inputted from the operation unit 29. In FIG. 3, a first mode implies an operation mode in which received facsimile data is not recorded but the facsimile data is transferred to the PC, a second mode implies an operation mode in which the received facsimile data is recorded, and the facsimile data is transferred to the PC. A third mode is an operation mode in which the received facsimile data is recorded but the facsimile data is not transferred to PC. FIG. 4 is a flowchart showing the recognition setting process repeatedly executed by the CPU 10 at all times.

When a switch command is inputted from the operation unit 29, the CPU 10 determines which mode is indicated by the switch command, among the first mode through the third mode (S100). If the switch command is determined to be a command for switching to the first mode, then the CPU 10 sets the receiving/printing function for facsimile data to OFF (S111) and sets the virtual drive function to ON (S113). Here, the receiving/printing function for facsimile data is a function for quickly and automatically printing facsimile data received from an external source via the line-controlling unit 25, without prompting the user for printing confirmation.

When the process in S113 ends, the CPU 10 creates the virtual drive area 12d in the RAM 12 and creates a plurality of folders in the virtual drive area 12d for sorting and storing various data (S115). Specifically, the CPU 10 in the preferred embodiment creates a first folder for storing image data for printing, a second folder for storing image data for fax transmissions, a third folder for storing image data for e-mail transmissions, and a fourth folder for storing facsimile data received via the line-controlling unit 25. After the plurality of folders has been created, the CPU 10 ends the process.

However, if the switch command is determined to be a command for switching to the second mode in S100, the CPU 10 sets the receiving/printing function for facsimile data to ON (S121) and sets the virtual drive function to ON (S123). In S125 the CPU 10 creates the virtual drive area 12d in the RAM 12 and creates the plurality of folders in the virtual drive area 12d. If the virtual drive area 12d has already been created, the process of S125 is skipped. Subsequently, the CPU 10 ends the switching process.

Further, if the switch command is determined in S100 to be a command for switching to the third mode, then the CPU 10 sets the receiving/printing function for facsimile data to ON (S131) and sets the virtual drive function to OFF (S133). Subsequently, the CPU 10 clears the virtual drive area 12d allocated in the RAM 12 and assigns this memory space to the user area 12c (S135). Subsequently, the CPU 10 ends the switching process.

Next, the recognition setting process (see FIG. 4) will be described. When the recognition setting process is executed, the CPU 10 waits until inquiry signals for confirming operations related to the USB device are transmitted from the personal computer 50 (S210).

Specifically, Windows (registered trademark) and other operating systems are configured to transmit a "TEST UNIT READY" command from a USB interface 58 at intervals of several seconds as an inquiry signal for confirming operations related to the USB device. If the CPU 10 determines that the "TEST UNIT READY" command has been transmitted from the personal computer 50 via the USB interfaces 58 and 37 (S210: YES), the CPU 10 makes judgment as to whether or not the virtual drive function is on (S220).

If the CPU 10 determines that the virtual drive function is off (S220: NO), then the CPU 10 prevents the personal computer 50 from recognizing the virtual drive area 12d in the RAM 12 as an external storage device by transmitting a "NOT READY" command to the personal computer 50 via the USB interface 37 indicating that the virtual drive is not ready to operate (S230).

However, if the CPU 10 determines that the virtual drive function is on (S220: YES), then the CPU 10 enables the personal computer 50 to recognize the virtual drive area 12d as an external storage device by transmitting a "READY" command to the personal computer 50 via the USB interface 37 indicating that the virtual drive is ready for operations (S240). After completing this process, the CPU 10 ends the recognition setting process.

Figure 5:
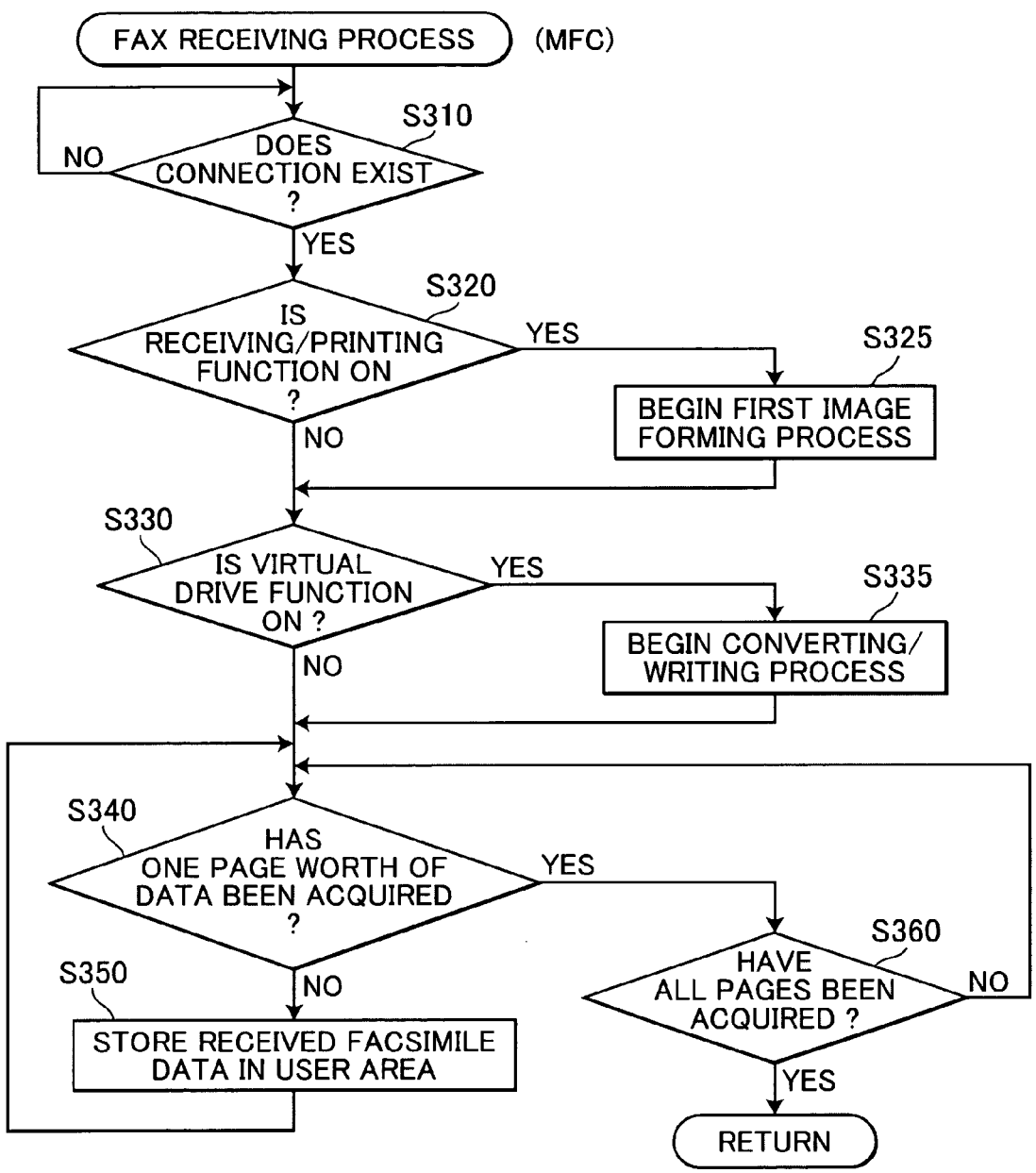
FIG. 5 is a flowchart showing steps in a fax receiving process executed by the CPU.

Next, a fax receiving process executed by the digital multifunction device 1 will be described. FIG. 5 is a flow-chart showing the fax receiving process that is repeatedly executed by the CPU 10.

At the beginning of the fax receiving process, the CPU 10 waits until a connection is established from the facsimile machine 5 to the line-controlling unit 25 via the public telephone network (S310). When a connection is established from the facsimile machine 5 to the line-controlling unit 25 (S310: YES), then in S320 the CPU 10 determines whether the receiving/printing function is on.

If the CPU 10 determines that the receiving/printing function is on (S320: YES), then the CPU 10 begins executing a first image forming process shown in FIG. 6 (S325) and advances to the process in S330. However, if the CPU 10 determines that the receiving/printing function is off (S320: NO), then the CPU 10 advances to S330 without executing the first image forming process.

In S330, the CPU 10 determines whether the virtual drive function is on. If the CPU 10 determines that the virtual drive function is on (S330: YES), then the CPU 10 begins executing a converting/writing process shown in FIG. 7 (S335) and subsequently advances to the process of S340. However, if the CPU 10 determines that the virtual drive function is off (S330: NO), then the CPU 10 advances to S340 without executing the converting/writing process.

In S340, the CPU 10 determines whether one page worth of facsimile data transmitted from the external facsimile machine 5 via the line-controlling unit 25 and the modem 27 has been acquired. If one page worth of data has not been acquired (S340: NO), then the CPU 10 acquires the facsimile data from the modem 27 and writes this data to the user area 12c (S350) until one page worth of facsimile data has been acquired (until a YES determination in S340).

When one page of worth of facsimile data has been written to the user area 12c, the CPU 10 determines YES in S340 and in S360 determines whether all pages of the facsimile data have been acquired (in other words, whether the facsimile machine 5 has completed transmission of the facsimile data).

If all pages of the facsimile data have not been acquired at this time (S360: NO), then the CPU 10 returns to S340, acquires the next page of facsimile data from the modem 27, and writes this data to the user area 12c. However, if the CPU 10 determines in S360 that all pages of facsimile data have been acquired (S360: YES), then the fax receiving process ends.

Figure 6:
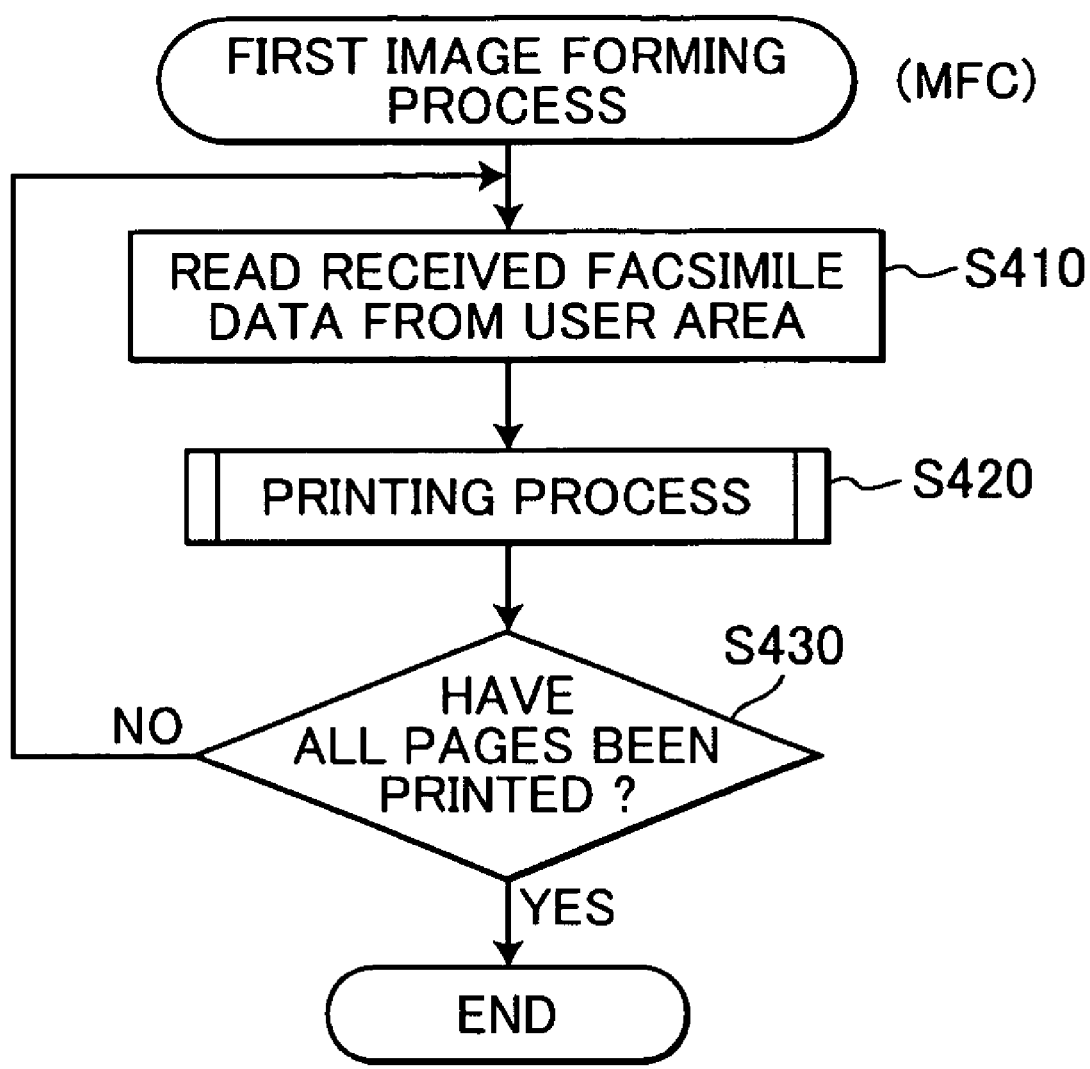
FIG. 6 is a flowchart showing steps in a first image forming process executed by the CPU.

Next, the first image forming process initiated in S325 will be described. FIG. 6 is a flowchart showing the first image forming process that the CPU 10 executes in parallel with the fax receiving process.

When execution of the first image forming process is begun, the CPU 10 reads the facsimile data written to the user area 12c in the fax receiving process from the user area 12c (S410). The data may be read after one page worth of facsimile data has been written in the fax receiving process or after a plurality of pages worth of facsimile data has been written. The facsimile data may also be read without waiting for one page worth of facsimile data to be written.

After reading the facsimile data, the CPU 10 inputs the data into the printing unit 23 and controls the printing unit 23 to form (print) images based on this facsimile data on recording paper (S420). Subsequently, the CPU 10 determines whether all pages of the facsimile data have been printed (S430). If the CPU 10 determines that the printing is not complete (S430: NO), then the CPU 10 continues reading facsimile data from the user area 12c that was written in the fax receiving process (S410) and executes the above printing process (S420). After all pages of the facsimile data have been printed (S430: YES), the first image forming process ends.

Figure 7:
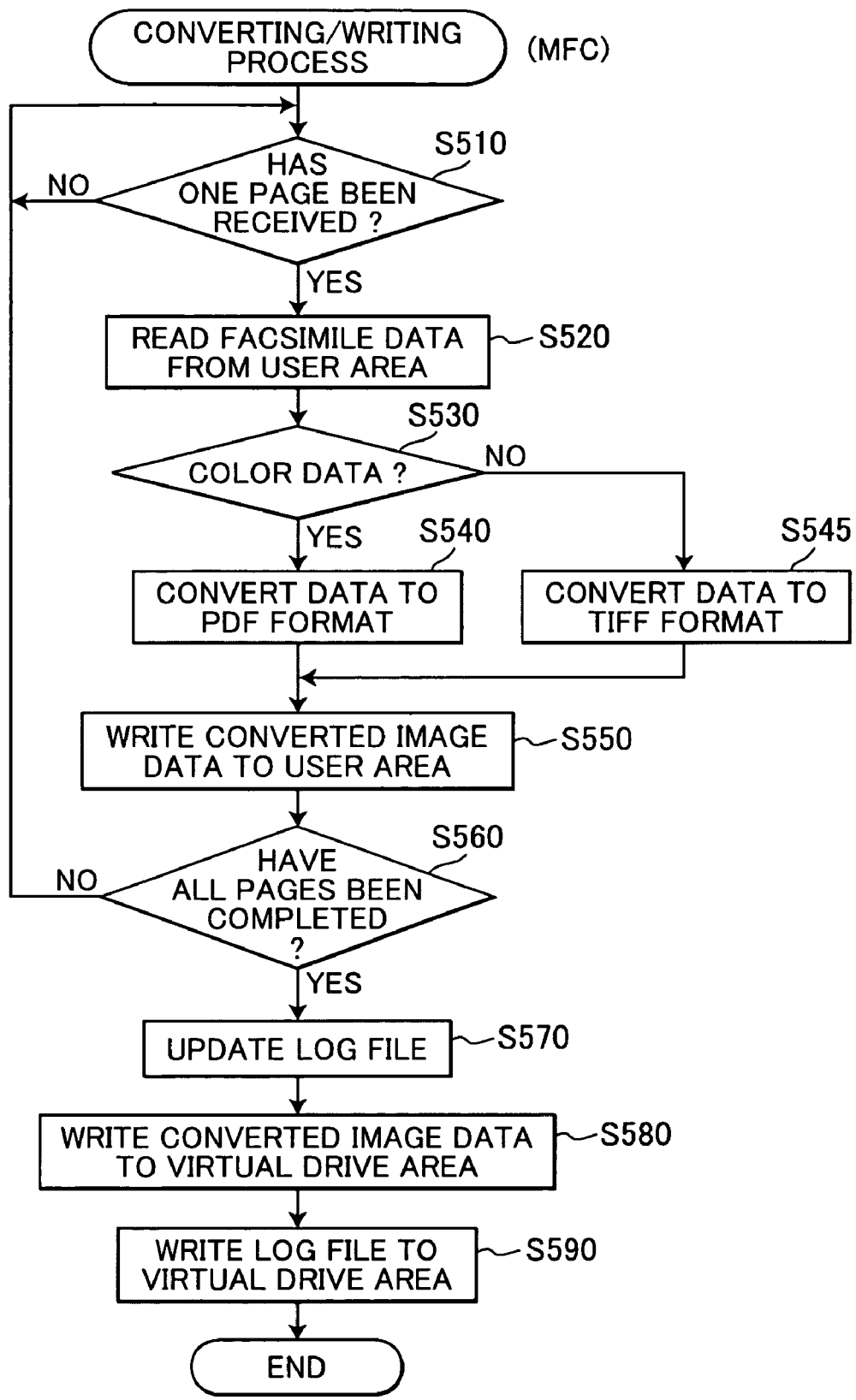
FIG. 7 is a flowchart showing steps in a converting/writing process executed by the CPU.

Next, the converting/writing process initiated in S335 will be described. FIG. 7 is a flowchart showing the converting/writing process that the CPU 10 executes in parallel with the fax receiving process.

When execution of the converting/writing process is begun, the CPU 10 waits until one page worth of facsimile data has been received and until this data has been written to the user area 12c (S510). After one page worth of facsimile data has been written to the user area 12c, the CPU 10 determines YES in S510 and reads this facsimile data from the user area 12c (S520).

Subsequently, the CPU 10 determines whether the facsimile data is color image data or monochrome image data (S530). If the CPU 10 determines that the facsimile data is color image data (S530: YES), then the CPU 10 converts the facsimile data to image data in the portable document format (PDF; S540).

Since facsimile data is generally encoded by the Modified Huffman (MH) method, in S540 the CPU 10 converts the image data in MH format to image data in PDF format, which is an image format that can be used by the personal computer 50 and in which data describing the arrangement of a plurality of pages can be embedded.

However, if the CPU 10 determines in S530 that the facsimile data is monochrome image data (S530: NO), then the CPU 10 converts the facsimile data to image data in tagged image file format (TIFF), which is an image format that can be used by the personal computer 50 and in which data describing the arrangement of a plurality of pages can be embedded (S545). Image data in the TIFF format stores data (tags) describing the arrangement of the plurality of pages and the image data for each page.

After the image data has been converted in this way, the CPU 10 writes the image data in the PDF format or the TIFF format that has been converted above to the user area 12c (S550). Subsequently, the CPU 10 determines whether all pages of the facsimile data have been converted to image data (S560). If the CPU 10 determines that not all pages have been converted (S560: NO), then the CPU 10 returns to S510, reads the next page of facsimile data from the user area 12c (S520), and converts this data to the PDF or TIFF format (S540 or S545). At this time, this next page of image data is combined with the previous page of image data to form a single image data (image data in the PDF or TIFF format). Next, the CPU 10 writes the converted image data to the user area 12c (S550).

When the CPU 10 determines that all pages of data have been converted (S560: YES), then the CPU 10 generates communication history data for the facsimile data just received. The CPU 10 updates the log file by writing this communication history data thereto (S570).

FIG. 8 is an explanatory diagram showing the structure of the log file. The log file stores data in the comma separated values (CSV) format, which is very versatile and compatible with the personal computer 50. This log file is stored in the work area 12b.

The CPU 10 generates communication history data based on results of receiving facsimile data from the line-controlling unit 25 and modem 27 and appends this data in the log file. The communication history data includes data regarding the reception date, reception time, type of communication, transmission source, length of communication, number of received pages, type of communication result, and filename of the received data. This log file is updated each time facsimile data is received. Therefore the log file stores communication history data for a plurality of communications.

Communication history data is written to the log file not only when facsimile data is received, but also when facsimile data is transmitted. Communication history data for facsimile transmissions includes data related to the transmission date, transmission time, type of communication, transmission destination, length of communication, number of transmitted pages, type of communication result, and filename of the transmitted data. Data related to the type of communication described above is used to differentiate communications of different types. For example, the characters "Rx" are attached to the communication history data for received faxes (when receiving facsimile data) as data representing the type of communication, while the characters "Tx" are attached to the communication history data for transmitted faxes. The type of communication result is data representing whether the communication was performed normally. If the communication concluded normally, the characters "OK" are added to the log file.

After updating the log file, in S580 the CPU 10 writes the converted image data to the fourth folder in the virtual drive area 12d. In S590 the CPU 10 writes the updated log file to the virtual drive area 12d, and subsequently ends the converting/writing process.

The operations of the digital multifunction device 1 were described above for a fax reception. When the personal computer 50 writes image data to the virtual drive area 12d while the virtual drive function is on, the digital multifunction device 1 reads this image data from the virtual drive area 12d and performs a prescribed process on the image data, such as a printing process, a fax transmitting process, or a mail transmitting process.

Figure 9:
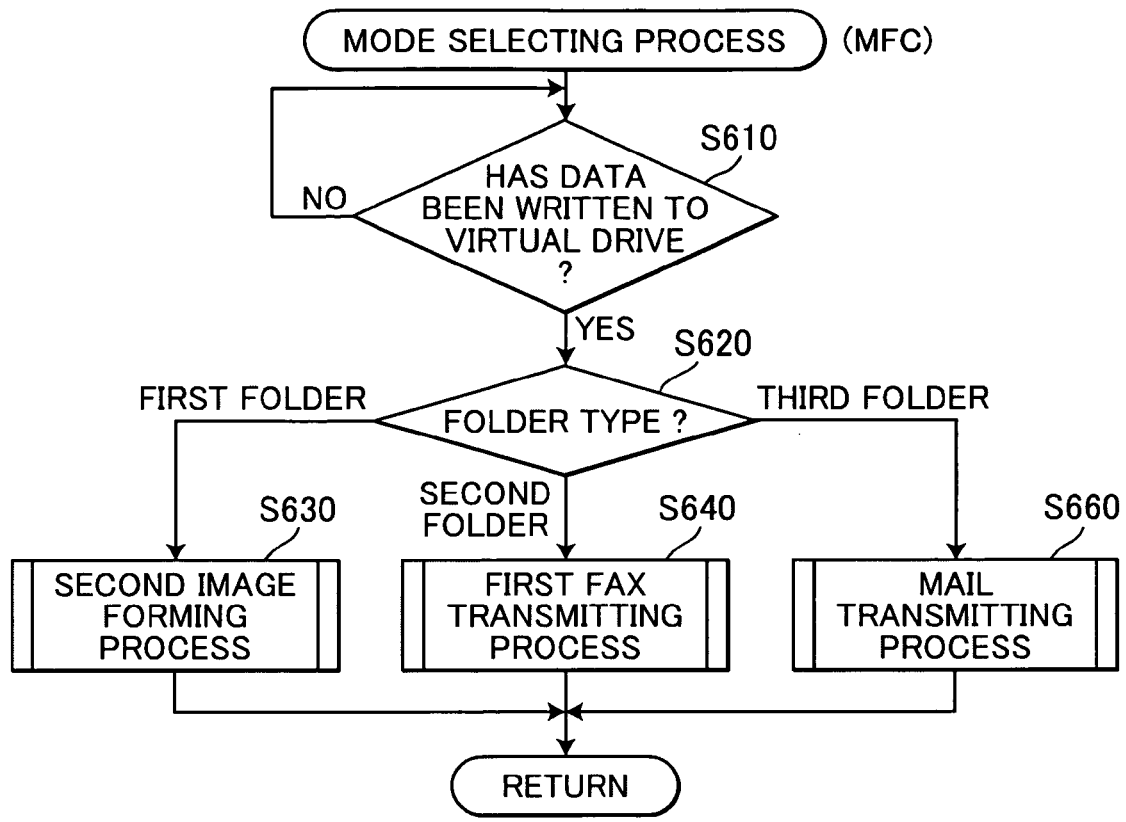
FIG. 9 is a flowchart showing steps in a mode selecting process executed by the CPU.

Next, the process executed by the CPU 10 when image data is written from the personal computer 50 into the virtual drive area 12d will be described. The CPU 10 selects one of a plurality of process modes according to the type of folder in which the image data has been written and executes a prescribed process corresponding to that mode on the image data. FIG. 9 is a flowchart showing a mode selecting process that the CPU 10 repeatedly executes at all times when the virtual drive function is on.

When executing the mode selecting process, the CPU 10 determines whether the personal computer 50 has written data to the virtual drive area 12d via the USB interface 37 (S610). If the CPU 10 determines that data has been written, then the CPU 10 determines to which of the first through third folders provided in the virtual drive area 12d the data has been written (S620).

Figure 10:
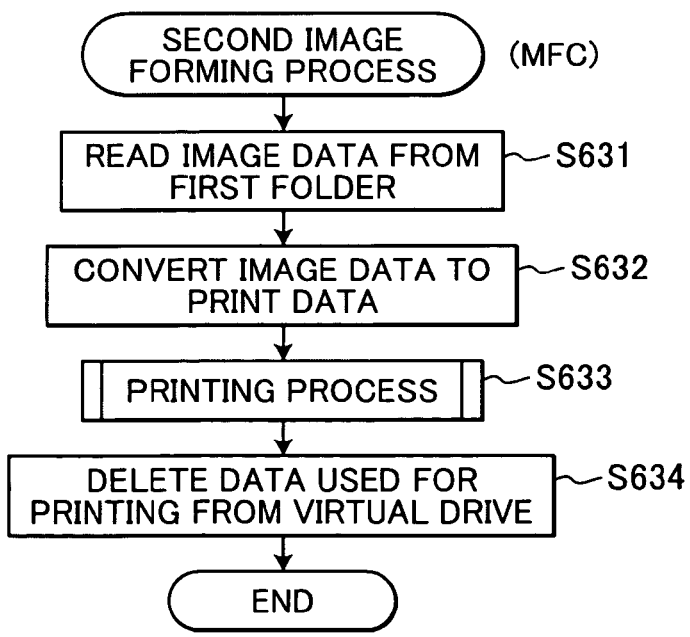
FIG. 10 is a flowchart showing steps in a second image forming process executed by the CPU.

If the CPU 10 determines that data has been written to the first folder, then the CPU 10 advances to the process of S630 and executes a second image forming process shown in FIG. 10. After completing the second image forming process, the mode selecting process ends.

FIG. 10 is a flowchart showing the second image forming process executed by the CPU 10. When the second image forming process is executed, the CPU 10 reads image data stored in the first folder of the virtual drive area 12d (S631). Next, the CPU 10 converts this image data into print data with which the printing unit 23 can form images (S632). The CPU 10 inputs this print data into the printing unit 23 and controls the printing unit 23 to form images on recording paper based on the print data (S633: printing process). After the printing is complete, the CPU 10 deletes the image data used for printing from the virtual drive area 12d (S634) and ends the second image forming process.

Figure 11:
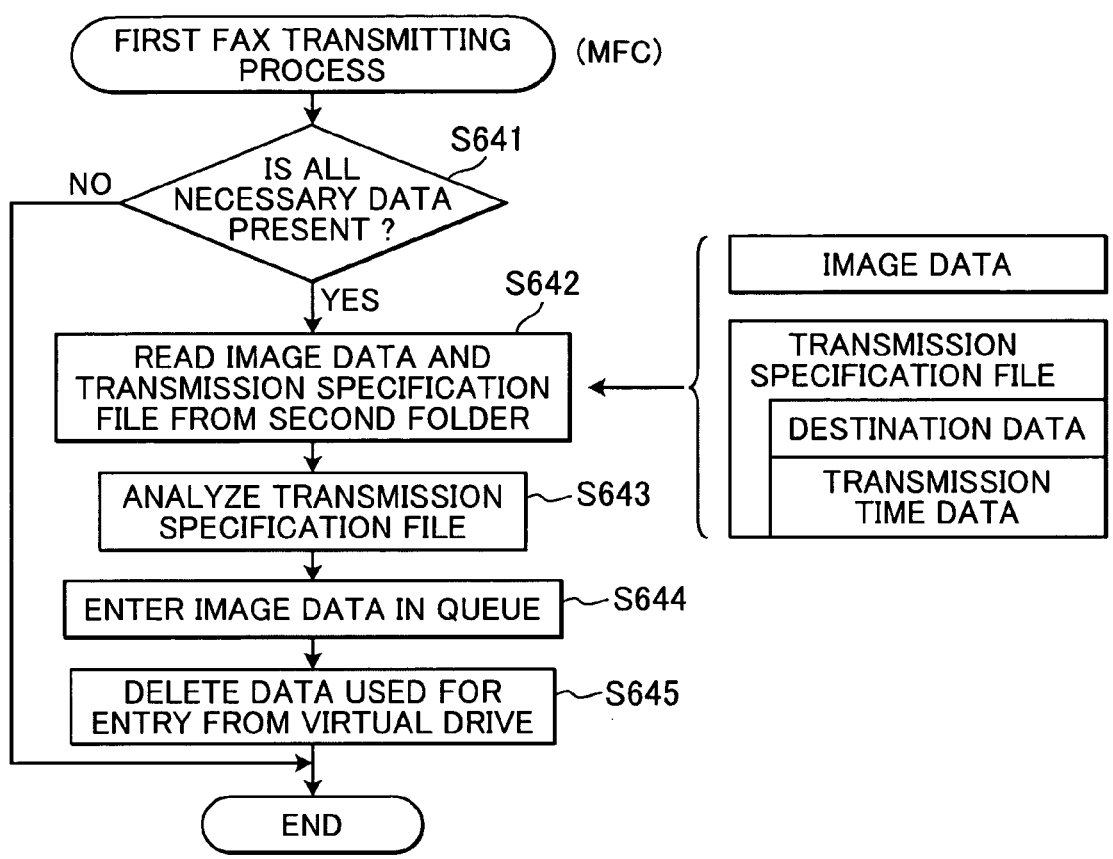
FIG. 11 is a flowchart showing steps in a first fax transmitting process executed by the CPU.

However, if the CPU 10 determines that data has been written to the second folder in S620, then the CPU 10 executes a first fax transmitting process shown in FIG. 11 (S640). After completing the first fax transmitting process, the CPU 10 ends the mode selecting process.

FIG. 11 is a flowchart showing the first fax transmitting process executed by the CPU 10. When the first fax transmitting process is executed, the CPU 10 determines whether all data required for the fax transmission has been stored together in the second folder (S641). Data required for the fax transmission includes image data for transmission (facsimile data) and a transmission specification file storing destination data and transmission time data. If all required data is not present (S641: NO), then the CPU 10 immediately ends the first fax transmitting process.

However, if all necessary data is stored in the second folder (S641: YES), then the CPU 10 reads the image data and transmission specification file attached to the image data from the second folder (S642). Subsequently, the CPU 10 analyzes the transmission specification file and determines the transmission destination and the transmission time for the image data (facsimile data; S643). Here, the destination data stored in the transmission specification file is transmission destination data representing a telephone number or the like of the transmission destination. The transmission time data stored in the file is data representing the time of transmission (date, hour, minute, etc.).

Next, the CPU 10 enters the image data (facsimile data) together with the transmission destination data and the transmission time data in a queue (S644). After entering the data in the queue, the CPU 10 deletes the image data for this entry and the transmission specification file corresponding to the image data from the virtual drive area 12d (S645) and ends the first fax transmitting process.

Figure 12:
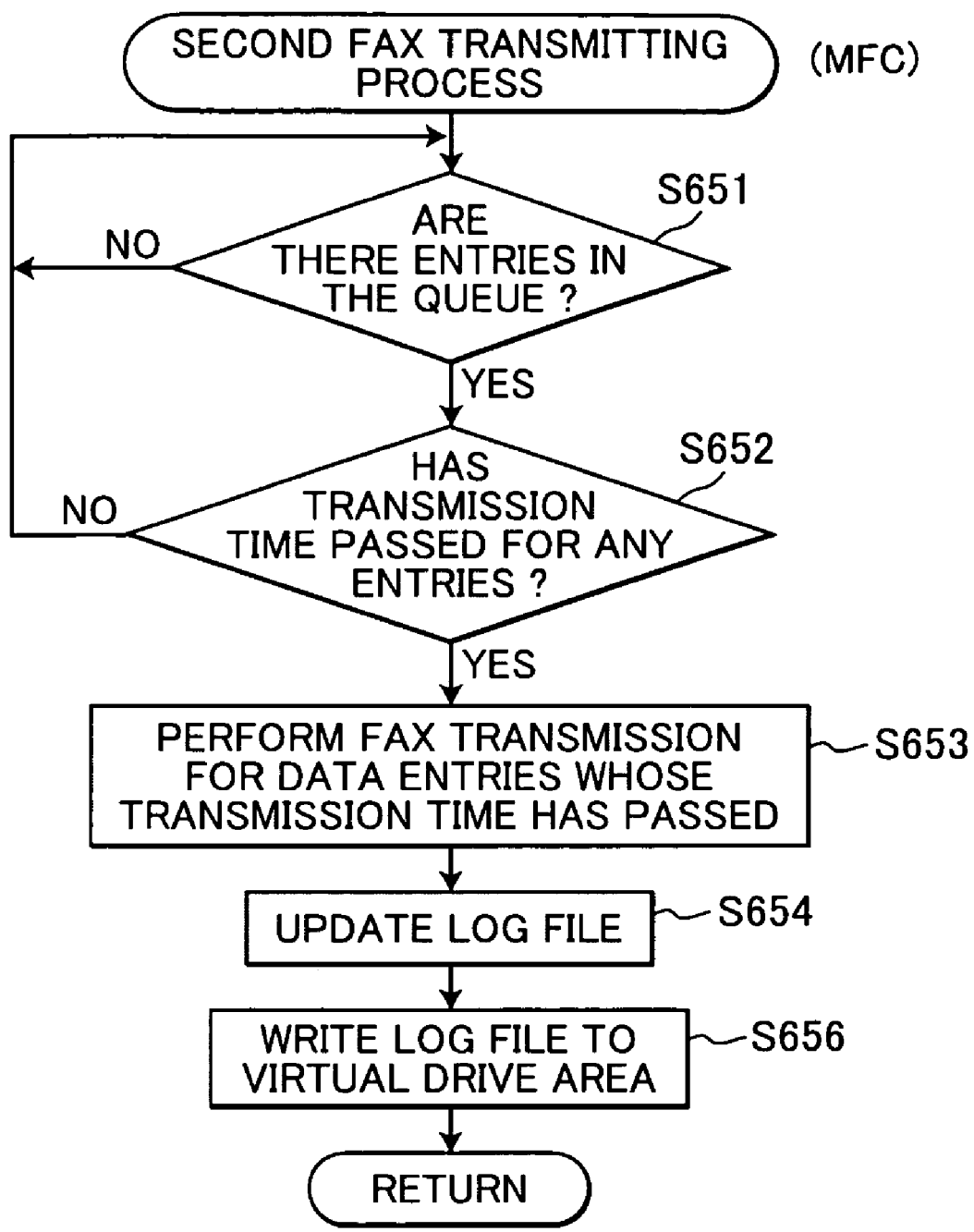
FIG. 12 is a flowchart showing steps in a second fax transmitting process executed by the CPU.

The facsimile data entered in the queue is transmitted to the facsimile machine 5 at the specified destination during a second fax transmitting process shown in FIG. 12. FIG. 12 is a flowchart showing the second fax transmitting process that the CPU 10 repeatedly executes at all times.

When the second fax transmitting process is executed, the CPU 10 determines whether facsimile data is entered in the queue (S651). If the CPU 10 determines that facsimile data has not been entered in the queue (S651: NO), then the CPU 10 waits until facsimile data has been entered in the queue.

However, when the CPU 10 determines that facsimile data is entered in the queue (S651: YES), then the CPU 10 determines whether the transmission time for the facsimile data has passed based on the transmission time data entered in the queue with the facsimile data (S652). If the CPU 10 determines that the transmission time has passed (S652: YES), then the CPU 10 transmits the facsimile data for which the transmission time has passed via the line-controlling unit 25 to the facsimile machine 5 at the destination specified in the first fax transmitting process based on the destination data (that is, the destination corresponding to the transmission destination data; S653).

Subsequently, the CPU 10 deletes the facsimile data for transmission from the queue, generates the above-described communication history data based on the transmission results of the line-controlling unit 25, and updates the log file by writing this data thereto (S654). Next, the CPU 10 writes the log file to the virtual drive area 12d (S656) and ends the second fax transmitting process.

Figure 13:
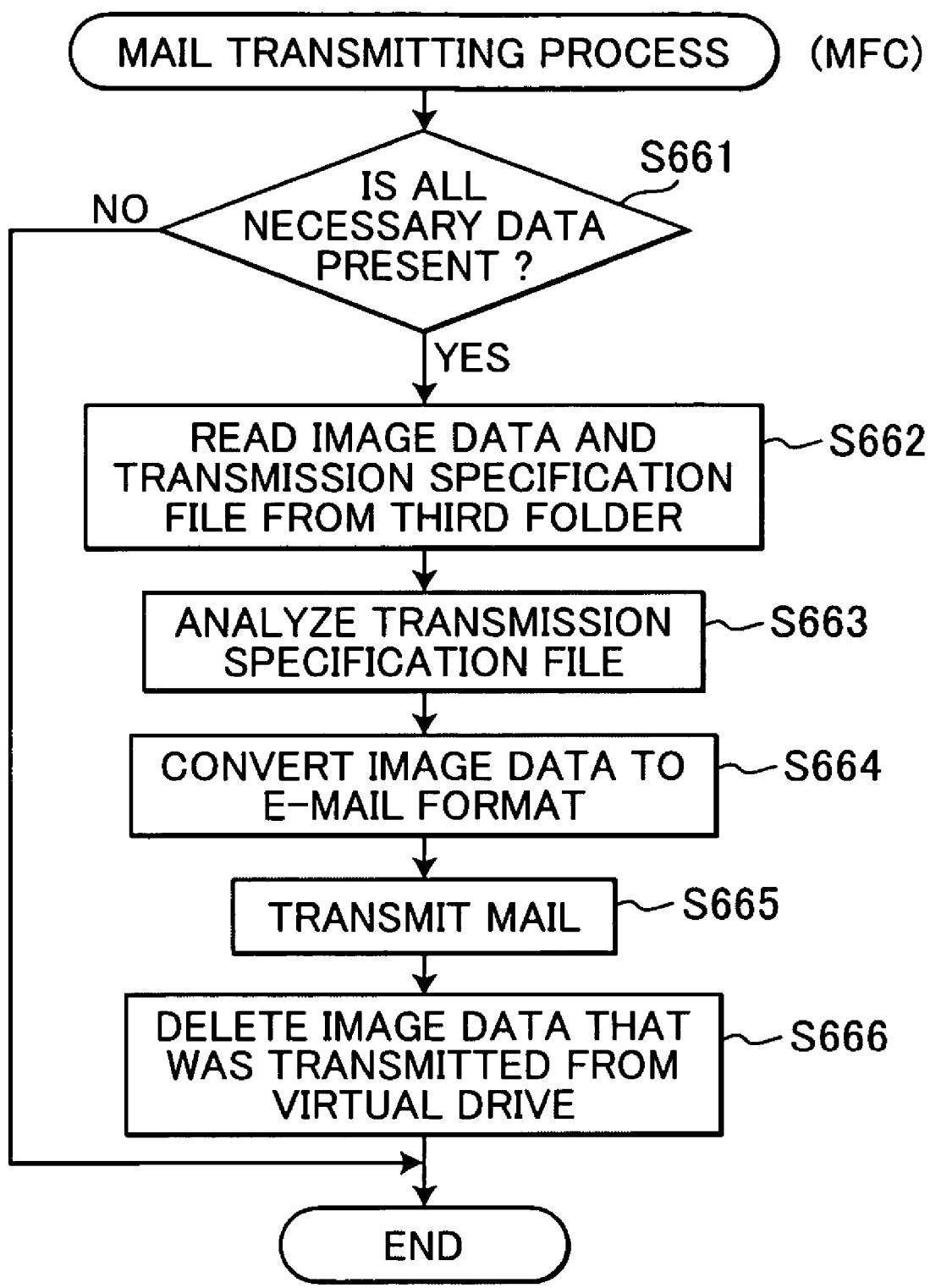
FIG. 13 is a flowchart showing steps in a mail transmitting process executed by the CPU.

Further, if the CPU 10 determines that data has been written to the third folder in S620 of the mode selecting process, the CPU 10 executes a mail transmitting process shown in FIG. 13 (S660). After completing the mail transmitting process, the CPU 10 ends the mode selecting process. FIG. 13 is a flowchart showing the mail transmitting process executed by the CPU 10.

When execution of the mail transmitting process begins, the CPU 10 determines whether data required for transmitting e-mail has been stored in the third folder (S661). Data required for transmitting e-mail in the preferred embodiment includes image data attached to the e-mail and a transmission specification file including destination data and the like. If the CPU 10 determines that this required data is not present (S661: NO), the CPU 10 immediately ends the mail transmitting process.

However, if the CPU 10 determines that all required data is present in the third folder (S661: YES), then the CPU 10 reads the image data and the transmission specification file from the third folder (S662). Next, the CPU 10 analyzes the transmission specification file, determines the transmission destination of the e-mail (S663). The transmission specification file includes data representing an e-mail address or the like as the destination data indicating the transmission destination.

Subsequently, the CPU 10 converts the image data to data in an e-mail format (S664) and transmits this image data in the e-mail format to the destination represented by the destination data in the transmission specification file via the LAN interface 39 and a mail (SMTP) server 7 on the Internet (S665). Further, the CPU 10 deletes the image data used for the transmission and the transmission specification file corresponding to this image data from the virtual drive area 12*d* (S666) and ends the mail transmitting process.

While the construction of the digital multifunction device 1 according to the preferred embodiment has been described above, the construction and operations of the personal computer 50 connected to and in communication with the digital multifunction device 1 via the USB interface 37 will be described next.

The personal computer 50 is well known in the art and includes a CPU 51, a ROM 52, a RAM 53, a hard disk 54, a display 55, a keyboard 56, a mouse 57, the USB interface 58, and a CD-ROM drive 59. The personal computer 50 is operated by an operating system such as Windows (registered trademark) having a Plug and Play function supporting USB.

A USB device (the digital multifunction device 1) connected to the USB interface 58 is detected and automatically recognized by the operating system of the personal computer 50. Specifically, the virtual drive area 12*d* of the digital multifunction device 1 is recognized by the Plug and Play function of the OS as an external storage device to the personal computer 50.

Programs for directing the CPU 51 to execute a data reading process and a terminal fax transmitting process described later can be optionally installed on the personal computer 50 by the user.

The program for the data reading process functions to manage various data stored in the virtual drive area 12*d* of the digital multifunction device 1. When this program is installed on the personal computer 50, the personal computer 50 functions as the data management device.

Figure 14:
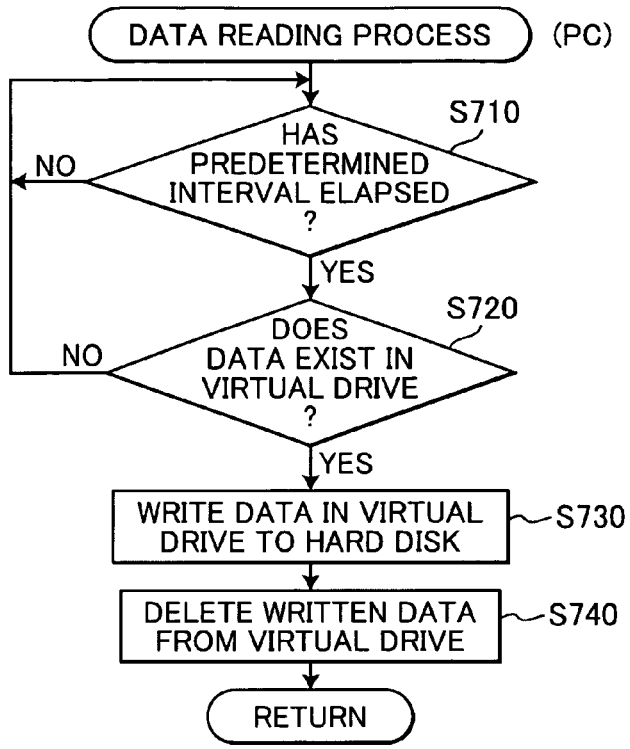
FIG. 14 is a flowchart showing steps in a data reading process executed by a CPU in a personal computer as a terminal device connected to the digital multifunction device.

FIG. 14 is a flowchart showing the data reading process executed by the CPU 51 of the personal computer 50. The CPU 51 repeatedly executes this data reading process at all times.

When the data reading process is executed, the CPU 51 waits until a predetermined interval has elapsed (S710). After the predetermined interval has elapsed (S710: YES), in S720 the CPU 51 determines whether image data has been written to the fourth folder in the virtual drive area 12*d*. If the CPU 51 determines that image data has not been written to the fourth folder (S720: NO), then the CPU 51 returns to S710 and again waits for the predetermined interval to elapse.

However, if the CPU 51 determines that image data has been written to the fourth folder (S720: YES), then the CPU 51 advances to S730 and writes the data in the fourth folder on the hard disk 54 provided in the personal computer 50 as a nonvolatile storage medium. At this time, the image data is written to a prescribed folder on the hard disk 54 that has been preset by the user (S730). If the writing concludes normally, the CPU 51 deletes the data in the fourth folder from the virtual drive area 12*d* (S740). Subsequently, the data reading process ends.

By this data reading process, image data in the virtual drive area that will be lost when the power is turned off can be transferred to a non-volatile storage medium. Accordingly, the user can easily see past image data (facsimile data) received by the digital multifunction device 1 at a later date on the display 55 of the personal computer 50.

Figure 15:
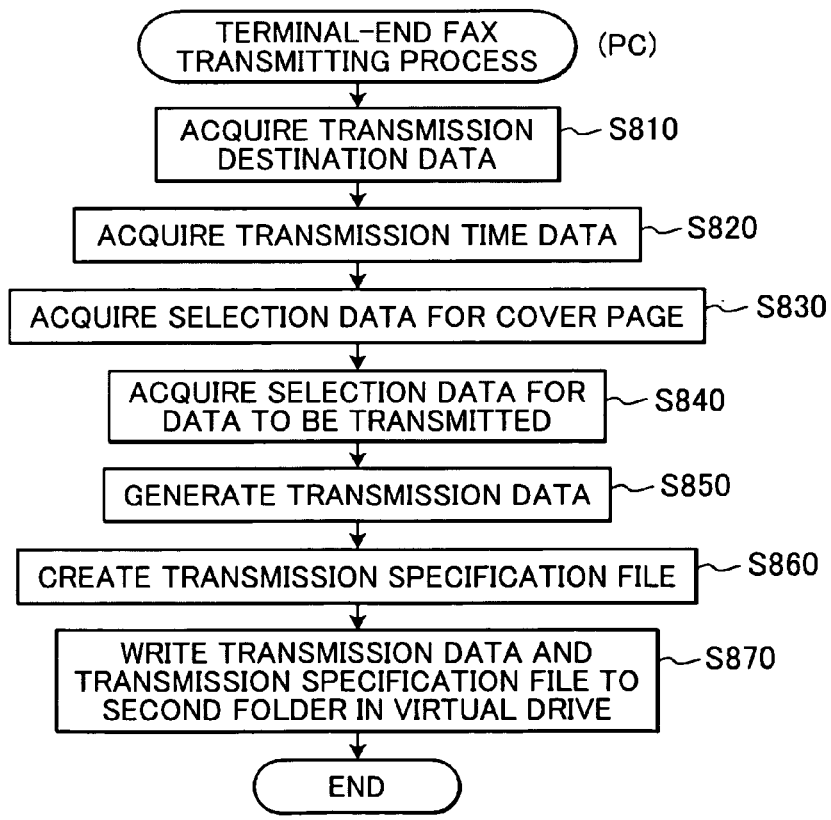
FIG. 15 is a flowchart showing steps in a terminal-end fax transmitting process executed by the CPU of the personal computer.

A program for a terminal-end fax transmitting process is designed for using the fax transmission function provided by the digital multifunction device 1 on the personal computer 50 end. FIG. 15 is a flowchart showing the terminal-end fax transmitting process executed by the CPU 51 when the user operates an input device such as the keyboard 56 or the mouse 57 to input a fax transmission command into the CPU 51.

At the beginning of the terminal-end fax transmitting process, the CPU 51 displays a dialog box on the display 55 of the personal computer 50, prompting the user for the transmission destination of the facsimile data and subsequently acquires transmission destination data from the facsimile data upon manipulation of the input device (S810).

Next, the CPU 51 displays a dialog box on the display 55 prompting the user to input the transmission time for the facsimile data and subsequently acquires transmission time data for the facsimile data via the input device (S820).

Next, the CPU 51 displays a dialog box on the display 55 prompting the user to select a cover page to be attached as the first page and subsequently acquires selection data for a cover page via the input device (S830). The data for the cover page is stored on the hard disk 54 of the personal computer 50.

The CPU 51 further displays a dialog box on the display 55, prompting the user to specify image data to be transmitted as the facsimile data and subsequently acquires selection data (the filename for the image data or the like) for the image data to be transmitted via the input device (S840).

Next, the CPU 51 reads the image data to be transmitted, which image data is stored on the hard disk 54, according to the cover page selection data acquired in S830 and the transmission data selection data acquired in S840. Thus, the CPU 51 generates transmission data (facsimile data) in S850. That is, the CPU 51 converts this image data to the MH format and attaches image data of the cover page to the image data as the top page.

The CPU 51 creates a transmission specification file (see FIG. 11) including the destination data and the transmission time data based on the transmission destination data and transmission time data acquired in S810 and S820 (S860).

Next, the CPU 51 writes the transmission data (facsimile data) generated above and the transmission specification file to the second folder in the virtual drive area 12*d* (S870) and ends the terminal-end fax transmitting process. The digital multifunction device 1 processes the transmission data and transmission specification file by means of the first fax transmitting process of FIG. 11.

To this point, a description has been given for the digital multifunction device 1 and the personal computer 50 of the preferred embodiment. According to the digital multifunction device 1 of the preferred embodiment, the CPU 10 enables the personal computer 50 to recognize the virtual drive area 12*d* in the RAM 12 as an external storage device in S240 of the recognition setting process. Hence, the personal computer 50 can access image data stored in the virtual drive area 12*d*.

As a result, the user can acquire from the digital multifunction device 1 only a required data among various image data those stored in the virtual drive area 12*d* by operation of the personal computer 50, with the same sense as reading data from the hard disk 54 of the personal computer 50.

In other words, the user of the personal computer 50 can acquire from the digital multifunction device 1 only a required data among various image data those stored in the virtual drive area 12d by manipulating the keyboard 56 and the mouse 57 with the same sense as reading data from the hard disk 54 at a desired timing, for example, when the image data is to be needed. That is, the multifunction device 1 can selectively transmit to the personal computer 50 only the image data that the user of the personal computer 50 is needed among various image data received through the line controlling unit and the modem 27 through the network.

Generally, a widely available recent computer such as a personal computer is normally provided with Plug and Play function capable of automatically recognizing a device connected to the personal computer. The Plug and Play function can permit the personal computer 50 to recognize the virtual drive area 12d as the external storage device. By enabling the personal computer 50 to recognize the virtual drive area 12d as an external storage device in the preferred embodiment based on the USB standard supporting Plug and Play, which is widely used in personal computers 50, the user need not install a special application software and driver or the like for enabling the personal computer 50 to recognize the virtual drive area 12d. The user can easily use the virtual drive function of the digital multifunction device 1.

That is, by the Plug and Play function if the personal computer 50 as the terminal device can automatically recognize a device in communication therewith, the personal computer 50 can recognize with the steps S115, S125, S135 the virtual drive area 12d as the external storage device through the function of the Plug and Play.

Further, in the digital multifunction device 1 according to the present embodiment, ON/OFF switching can be made in accordance with a user's demand with respect to the receiving/printing function (i.e., the first image forming process with reference to FIG. 6) and to the virtual drive function (i.e., converting/writing process with reference to FIG. 7) by executing the switching process with reference to FIG. 3 in the CPU10. Accordingly, image data can be processed by various ways in accordance with the using mode of the user.

In addition, in the digital multifunction device 1 according to the present embodiment, the RAM 12 defines therein the user area 12c and the virtual drive area 12d so as to share the RAM 12, and the virtual drive area 12d can be functioned as an expanded user area in case where the virtual drive function is being off. Therefore, a memory resource in the device can be effectively utilized. In other words, a cost to the memory can be reduced, to thus produce the digital multifunction device 1 at a low cost. That is, it is unnecessary to provide the RAM 12 having a large storage capacity (such as a semiconductor memory), to thus lower the production cost.

Further, in the converting/writing process of the present embodiment, the facsimile data acquired through the modem 27 is converted into image data available for multiple pages (PDF) by way of the steps S540 and S545, and the image data of each page is put together to provide a data file. Therefore, the user can easily handle the image data already subjected to the conversion.

Since the facsimile data is constituted by image data for a plurality of pages, it is unnecessary to create data file through dividing the facsimile data into every page data if the facsimile data is converted into image data capable of handing multiple pages. Therefore, handling to the image data which has been subjected to data conversion can be simplified for the user of the personal computer 50. Image data of PDF (portable document format) and image data of TIFF (tagged image file format) are known as examples of the image data capable of handling multiple pages.

Moreover, in the present embodiment, communication history data as a result of communication through the communication unit such as the line controlling unit 25 and the modem 27 is written into the log file which is the history data file and very versatile and compatible with the personal computer 50, and the log file is written into the virtual drive area 12d. Therefore, the user can easily confirm the communication history data at the personal computer 50.

Further, image data is written into the virtual drive area 12d from various sources. In such a case, concurrent writing of the image data from various sources must be prohibited, unless the data processing is constructed to recognize the source of the image data written into the virtual drive area 12d.

If sorting arrangement is provided in the memory unit, concurrent writing of the image data into the virtual drive area 12d not only from the writing unit but also from the terminal device 50 can be performed. Therefore, convenience of the digital multifunction device 1 can be enhanced.

In the present embodiment, folder structures are provided in the virtual drive area 12d, so that the kind of data in the virtual drive area 12d can be acknowledged, whereupon various process operations such as facsimile transmission through the virtual drive area 12d can be performed at the digital multifunction device 1.

Further, in the digital multifunction device 1, image data for facsimile transmission can be acquired from the personal computer 50 through the virtual drive area 12d, and the image data can be transmitted to the destination specified by the user. Thus, convenient handling can result.

In addition, generally, facsimile transmission at midnight is very annoying for the opponent. In the present embodiment however, such problem can be avoided since transmission time can be instructed at random to the digital multifunction device 1 through the transmission specification file.

Further, in the multifunction device 1, because the RAM 12 is a volatile memory, image data storage cannot be maintained when the multifunction device 1 is turned off. However the personal computer 50 connected to the multifunction device can store the image data in the RAM 12 into the hard disk 54 in order to avoid loss of the image data stored in the RAM 12.

Further, since the personal computer 50 is equipped with with the data deleting function (S740), for deleting the image data stored in the virtual drive area 12d after duplication, it is possible to avoid a situation where new image data cannot be any more written into the virtual drive area due to successive storage of the image data thereinto.

Incidentally, the programs for implementing the various processes executed by the CPU 10 and the CPU 51 can be supplied to the user on a recording medium such as a CD-ROM or flexible disk.

While the invention has been described in detail and with reference to specific embodiment thereof, it would be apparent to those skilled in the art that various changes and modifications may be made therein without departing from the scope of the invention.

For example, in the preferred embodiment, the personal computer 50 and the digital multifunction device 1 are connected using the USB interface 37, and the personal computer 50 is enabled to recognize the virtual drive area 12d as an external storage device based on the USB standard. However, an interface according to the IEEE 1394 standard or another interface may be used in place of the USB interface 37. However, such interfaces should preferably support Plug and Play.

Further, a dialog box can be displayed on the display 55 in the terminal-end fax transmitting process that prompts the user to select an image quality mode for the facsimile data (standard, fine, or superfine). Image quality selection data for the image quality mode acquired from the input device may be embedded in the transmission specification file.

In addition, in the mail transmitting process shown in FIG. 13, concurrently with the second facsimile transmitting process, communication history data indicating destination of e-mail, transmitting date, transmitting time, and a name of transmitted data can be generated after e-mail transmission, and the generated communication history data can be written into the log file.

What is claimed is:

1. A data processing device that is connected to and in communication with a terminal device, comprising:
   a communication unit connected to the terminal device through an external network;
   a memory unit comprising an image data storage area that stores therein image data;
   a recognition setting unit that enables the terminal de-vice to recognize the image data storage area in the memory unit as an external storage device so as to enable the terminal device to be accessible to the image data storage area;
   a data acquiring unit that acquires image data received by way of the communication unit from the external network;
   a converting unit that converts the acquired image data acquired by the data acquiring unit through the communication unit into converted image data whose format is compatible with the terminal device; and
   a writing unit that writes the converted image data converted by the converting unit into the image data storage area.

2. The data processing device as claimed in claim 1, further comprising;
   an image forming unit that forms a visible image on an image recording medium, the visible image being based on the acquired image data acquired by the data acquiring unit through the communication unit; and
   a switching unit that performs on/off control to the writing unit based on a command signal.

3. The data processing device as claimed in claim 2, further comprising an input operation unit comprising a plurality of keys for inputting the command signal.

4. The data processing device as claimed in claim 2, wherein the switching unit provides a first mode that renders the writing unit on and the image forming unit off, a second mode that renders the writing unit on and the image forming unit on, and a third mode that renders the writing unit off and the image forming unit on, the switching unit selecting one of the first through third modes based on the command signal so that on/off control is performed with respect to the writing unit and the image forming unit.

5. The data processing device as claimed in claim 2, wherein the memory unit further comprises a temporary storing region that temporarily storing the image data which has not been converted by the converting unit,
   the data acquiring unit being arranged for writing the acquired image data acquired through the communication unit into the temporary storing region; and
   the recognition setting unit permitting the image data storage area to function as an expansion region of the temporary storing region while the writing unit is rendered off by the switching unit.

6. The data processing device as claimed in claim 1, wherein the memory unit further comprises a temporary storing region that temporarily storing the image data which has not been converted by the converting unit, the data acquiring unit writing the acquired image data acquired through the communication unit into the temporary storing region.

7. The data processing device as claimed in claim 1, wherein the communication unit is arranged to receive a facsimile data as the image data, the converting unit converting the facsimile data acquired through the communication unit by the data acquiring unit into image data in another format that is compatible with the terminal device and in which data as to the arrangement of a plurality of pages is embeddable.

8. The data processing device as claimed in claim 1, further comprising a history writing unit that converts communication history data of the communication unit into a history data compatible with the terminal device and writes the converted history data into the image data storage area.

9. The data processing device as claimed in claim 8, wherein the history writing unit comprises:
   an update portion that updates a log file indicating a plurality of data relating to data transmission and data reception; and
   a writing portion that writes the log file into the image data storage area.

10. The data processing device as claimed in claim 1, wherein the terminal device transmits to the image data storage area the image data and destination command data added thereto and indicative of the destination of the image data; and the data processing device further comprising a data transmission unit comprising:
    a reading portion that reads the image data and the destination command data from the image data storage area upon entry of the image data into the image data storage area from the terminal device; and
    a transmitting portion that transmits the image data based on the destination command data through the communication unit.

11. The data processing device as claimed in claim 10, wherein the image data storage area is divided into at least first storage area and a second storage area for storing and storing the image data written by the writing unit in the first storage area and for sorting and storing the image data transmitted from the terminal device in the second storage area.

12. The data processing device as claimed in claim 10, wherein the destination command data includes a transmission time data representing a time at which the image data is to be transmitted to a destination, the transmitting portion transmitting the image data to the destination based on the destination command data through the communication unit at the transmission time represented by the transmission time data.

13. The data processing device as claimed in claim 10, wherein the image data is a facsimile data, and
    wherein the communication unit is connected to an external facsimile machine through a network for transmitting the facsimile data thereto; and
    the transmitting portion transmitting the facsimile data to the external facsimile machine based on the destination command data through the communication unit.

14. The data processing device as claimed in claim 13, wherein the communication unit comprises a line controlling portion connected to a public telephone network; and a modem connected to the line-controlling portion for converting the facsimile data to a communication signal to be transmitted via the public telephone network and for extracting the facsimile data by demodulating signals received from the public telephone network.

15. The data processing device as claimed in claim 1, wherein the terminal device is provided with a Plug and Play function for automatically recognizing a device connected to and in communication with the terminal device; and wherein the recognition setting unit uses the Plug and Play function provided in the terminal device to enable the terminal device to recognize the image data storage area in the memory unit as the external storage device.

16. The data processing device as claimed in claim 15, further comprising;

an image forming unit that forms a visible image on an image recording medium, the visible image being based on the acquired image data acquired by the data acquiring unit through the communication unit; and a switching unit that performs on/off control to the writing unit based on a command signal.

17. The data processing device as claimed in claim 16, further comprising an input operation unit comprising a plurality of keys for inputting the command signal.

18. The data processing device as claimed in claim 16, wherein the switching unit provides a first mode that renders the writing unit on and the image forming unit off, a second mode that renders the writing unit on and the image forming unit on, and a third mode that renders the writing unit off and the image forming unit on, the switching unit selecting one of the first through third modes based on the command signal so that on/off control is performed with respect to the writing unit and the image forming unit.

19. The data processing device as claimed in claim 16, wherein the memory unit further comprises a temporary storing region that temporarily stores the image data which has not been converted by the converting unit, the data acquiring unit being arranged for writing the acquired image data acquired through the communication unit into the temporary storing region; and the recognition setting unit permitting the image data storage area to function as an expansion region of the temporary storing region while the writing unit is rendered off by the switching unit.

20. The data processing device as claimed in claim 15, wherein the memory unit further comprises a temporary storing region that temporarily stores the image data which has not been converted by the converting unit, the data acquiring unit writing the acquired image data acquired through the communication unit into the temporary storing region.

21. The data processing device as claimed in claim 15, wherein the communication unit is arranged to receive a facsimile data as the image data, the converting unit converting the facsimile data acquired through the communication unit by the data acquiring unit into image data in another format that is compatible with the terminal device and in which data as to the arrangement of a plurality of pages is embeddable.

22. The data processing device as claimed in claim 15, further comprising a history writing unit that converts communication history data of the communication unit into a history data compatible with the terminal device and writes the converted history data into the image data storage area.

23. The data processing device as claimed in claim 22, wherein the history writing unit comprises:

an updating portion that updates a log file indicating a plurality of data relating to data transmission and data reception; and a writing portion that writes the log file into the image data storage area.

24. The data processing device as claimed in claim 15, wherein the terminal device transmits to the image data storage area the image data and destination command data added thereto and indicative of the destination of the image data; and the data processing device further comprising a data transmission unit comprising:

a reading portion that reads the image data and the destination command data from the image data storage area upon entry of the image data into the image data storage area from the terminal device; and a transmitting portion that transmits the image data based on the destination command data through the communication unit.

25. The data processing device as claimed in claim 24, wherein the image data storage area is divided into at least first storage area and a second storage area for storing and storing the image data written by the writing unit in the first storage area and for sorting and storing the image data transmitted from the terminal device in the second storage area.

26. The data processing device as claimed in claim 24, wherein the destination command data includes a transmission time data representing a time at which the image data is to be transmitted to a destination, the transmitting portion transmitting the image data to the destination based on the destination command data through the communication unit at the transmission time represented by the transmission time data.

27. The data processing device as claimed in claim 24, wherein the image data is a facsimile data, and wherein the communication unit is connected to an external facsimile machine through a network for transmitting the facsimile data thereto; and the transmitting portion transmitting the facsimile data to the external facsimile machine based on the destination command data through the communication unit.

28. The data processing device as claimed in claim 27, wherein the communication unit comprises a line controlling portion connected to a public telephone network; and a modem connected to the line-controlling portion for converting the facsimile data to a communication signal to be transmitted via the public telephone network and for extracting the facsimile data by demodulating signals received from the public telephone network.

29. A facsimile machine comprising:

a scanner unit that reads an image of an original document;

a communication unit connected to a terminal device through a network;

a memory unit comprising an image data storage area that stores therein image data;

a recognition setting unit that enables the terminal de-vice to recognize the image data storage area in the memory unit as an external storage device so as to enable the terminal device to be accessible to the image data storage area;

a data acquiring unit that acquires image data received by way of the communication unit from the external network;

a converting unit that converts the acquired image data acquired by the data acquiring unit through the communication unit into converted image data whose format is compatible with the terminal device; and a writing unit that writes the converted image data converted by the converting unit into the image data storage area.

30. A data managing device for use in combination with the data processing device as claimed in claim 1, comprising:

a nonvolatile storage medium that stores image data;

a determination unit that makes judgment as to whether or not the image data has been stored in the external storage device in the data processing device;

a duplicating unit that writes the image data stored in the external storage device into the nonvolatile storage medium if the determination unit judges that the image data has been stored in the external storage device; and a deletion unit that deletes the image data having been stored in the external storage device from the external storage device after writing the image data into the nonvolatile storage medium by the duplicating unit.

31. A computer-readable storage medium that stores a computer-executable program that causes a facsimile machine to function as a data processing device, the facsimile machine including a communication unit connected to a terminal device through an external network, and a memory unit comprising an image data storage area that stores therein image data, the program comprising:

instructions for enabling the terminal device to recognize the image data storage area in the memory unit as an external storage device so as to enable the terminal device to be accessible to the image data storage area;

instructions for acquiring image data received by way of the communication unit from the external network;

instructions for converting the acquired image data through the communication unit into converted image data whose format is compatible with the terminal device; and instructions for writing the converted image data converted by the converting unit into the image data storage area.

32. A computer-readable storage medium that stores a computer-executable program that causes a personal computer to function as a data managing device for use in combination with the data processing device as claimed in claim 1, the personal computer including a nonvolatile storage medium that stores image data, the program comprising:

instructions for making a judgment as to whether or not the image data has been stored in the external storage device in the data processing device;

instructions for duplicating the image data stored in the external storage device into the nonvolatile storage medium if the image data has been stored in the external storage device; and instructions for deleting the image data having been stored in the external storage device from the external storage de-vice after duplicating the image data into the nonvolatile storage medium.

* * * * *